US010139765B1

(12) United States Patent
Nakamura

(10) Patent No.: US 10,139,765 B1
(45) Date of Patent: Nov. 27, 2018

(54) IMAGE FORMING APPARATUS, IMAGE FORMING SYSTEM, AND IMAGE FORMATION CONTROL PROGRAM

(71) Applicant: Konica Minolta, Inc., Chiyoda-ku, Tokyo (JP)

(72) Inventor: Mitsunori Nakamura, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/959,513

(22) Filed: Apr. 23, 2018

(30) Foreign Application Priority Data

May 23, 2017 (JP) ................................ 2017-101531

(51) Int. Cl.
  *G03G 15/00* (2006.01)
  *G01J 3/46* (2006.01)
(52) U.S. Cl.
  CPC ............ *G03G 15/5062* (2013.01); *G01J 3/46* (2013.01); *G03G 15/6517* (2013.01); *G03G 15/6591* (2013.01); *G01J 2003/466* (2013.01); *G03G 2215/00556* (2013.01); *G03G 2215/00603* (2013.01)
(58) Field of Classification Search
  CPC ........... G03G 15/5062; G03G 15/6517; G03G 15/6591; G03G 2215/00556; G01J 3/46; G01J 2003/466
  See application file for complete search history.

(56) References Cited

U.S. PATENT DOCUMENTS

| 2016/0062296 A1* | 3/2016 | Nakamura | ......... G03G 15/6558 399/15 |
| 2016/0366296 A1* | 12/2016 | Isokawa | ............. H04N 1/00724 |
| 2017/0102648 A1* | 4/2017 | Arai | ...................... G03G 15/01 |

FOREIGN PATENT DOCUMENTS

JP       2016-48309 A       4/2016

* cited by examiner

*Primary Examiner* — G. M. A Hyder
(74) *Attorney, Agent, or Firm* — Buchanan Ingersoll & Rooney PC

(57) ABSTRACT

An image forming apparatus includes: an image former that forms an image on a transfer paper sheet; a colorimeter that reads the image; a conveyor that conveys the transfer paper sheet in the image formation and the reading of the image; and a controller that controls the formation of the image, and the reading and the conveyance of the image, wherein when a first conveyance velocity is a velocity at which the transfer paper sheet is conveyed when the image is formed by the image former, a second conveyance velocity is a velocity that is lower than the first conveyance velocity, and a long paper sheet having a longer transfer sheet length than a predetermined threshold value is used as the transfer paper sheet in an adjustment mode, the controller controls the image former and the conveyor, and controls the colorimeter and the conveyor.

19 Claims, 14 Drawing Sheets

FIG. 6

| ADJUSTMENT MODE | USE OF COLORIMETER | ADJUSTMENT PATTERN NUMBER |
|---|---|---|
| DENSITY ADJUSTMENT | USE | 101 |
| COLOR ADJUSTMENT | USE | 102 |
| SIDE ADJUSTMENT | NOT USE | 103 |

FIG. 7

| TRAY NAME | SHEET SIZE (MAIN SCANNING DIRECTION × CONVEYING DIRECTION) | PAPER TYPE | BASIS WEIGHT (g/m$^2$) | VELOCITY |
|---|---|---|---|---|
| TRAY 1 | A4 | NORMAL | 70 | HIGH |
| TRAY 2 | A3 | GLOSS | 250 | LOW |
| TRAY 3 | 320mm×460mm | HIGH QUALITY | 120 | HIGH |
| TRAY 4 | 297mm×630mm | NORMAL | 80 | HIGH |
| MANUAL FEED TRAY | 220mm×750mm | NORMAL | 80 | HIGH |
| EXTERNAL ROLL | 320mm×2000m | NORMAL | 80 | HIGH |

FIG. 8

| WRITING MODE | VELOCITY (mm/s) |
|---|---|
| HIGH | 450 |
| INTERMEDIATE | 300 |
| LOW | 180 |

FIG. 9

| SHEET READING MODE | READING VELOCITY (mm/s) | NUMBER OF TIMES READING IS PERFORMED ON 1 PATCH |
|---|---|---|
| NON-LONG PAPER SHEET | 330 | 5 |
| LONG PAPER SHEET | DEPENDING ON WRITING VELOCITY (INTERMEDIATE) | 5 |
| LONG PAPER SHEET (PATTERN ELONGATED) | DEPENDING ON WRITING VELOCITY (HIGH) | 5 |
| LONG PAPER SHEET | DEPENDING ON WRITING VELOCITY (HIGH) | 3 |

IMAGE FORMING APPARATUS, IMAGE FORMING SYSTEM, AND IMAGE FORMATION CONTROL PROGRAM

The entire disclosure of Japanese patent Application No. 2017-101531, filed on May 23, 2017, is incorporated herein by reference in its entirety.

BACKGROUND

Technological Field

The present invention relates to an image forming apparatus, an image forming system, and an image formation control program, and more particularly, to a technique for performing appropriate colorimetry using an adjustment image formed on a long paper sheet.

Description of the Related Art

An image forming apparatus has an image adjustment mode. In this image adjustment mode, colorimetric patches in different colors are printed to increase the quality of the image to be output. The colorimetric patches are detected by a colorimeter such as a spectrophotometer, and are compared with print base data. If there is a difference between the colorimetric patches and the print base data, the image former is automatically adjusted according to a known conventional technology. To shorten the image adjustment time and the like, an image reading apparatus in which a colorimeter is mounted in an in-line fashion (in the middle of a transfer sheet conveyance path) has also been developed for image forming apparatuses.

Further, in an image forming apparatus of this type, an image can be formed not only on a transfer paper sheet that is a non-long paper sheet cut into a predetermined standard size such as A4 or B4, but also on a transfer paper sheet having a greater transfer sheet length in the conveying direction than a predetermined threshold value.

Such long paper sheets are often used for triple- or quarter-folded pamphlets, banners, and repetitive printing of sticker-type labels such as addresses, serial numbers, and product descriptions.

In a case where an image is formed on a long paper sheet, the image former and the colorimeter, and the postprocessor convey the transfer paper sheet while nipping it. To cause no wrinkles in the transfer paper sheet, it is necessary for the colorimeter and the postprocessor to convey the transfer paper sheet at the same velocity as the conveyance velocity (the writing linear velocity) used for the image formation.

In the case of a non-long paper sheet that has a shorter transfer sheet length in the conveying direction than a predetermined threshold value, and is not to be nipped simultaneously by the image former and the colorimeter, the inter-sheet difference that appears between transfer paper sheets is used, and the colorimeter and the postprocessor can convey the transfer paper sheet at a different velocity from the conveyance velocity (the writing linear velocity) used at the time of image formation.

For this reason, in a case where an adjustment image such as colorimetric patches formed on a long paper sheet is read with the colorimeter disposed in the transfer sheet conveyance path, the rear end of the transfer paper sheet is nipped by the image former at least at the start of reading. Therefore, it is necessary to convey the long paper sheet at the same reading conveyance velocity (reading linear velocity) as the conveyance velocity (writing linear velocity) used during the image formation.

Meanwhile, in a case where a spectrophotometer is used, colors are generated by calculating the L* a* b* color space data and the X-Y-Z color space data from reflected light of each spectral. A spectrophotometer emits light rays of various wavelengths toward the patch to be subjected to colorimetry, and the spectrum of the reflected light is acquired. Here, it is necessary for the spectrophotometer to measure the same patch several times, and therefore, it is necessary to pass each paper sheet at a velocity equal to or lower than a predetermined reading conveyance velocity.

Therefore, in a case where an image on a long paper sheet is conveyed at an image formation conveyance velocity that is higher than the reading conveyance velocity, the adjustment pattern cannot be read with the spectrophotometer.

JP 2016-48309 A suggests various techniques related to this kind of technology.

In JP 2016-48309 A, in a calibration mode for calibrating the in-line sensor with the spectrophotometer, an image is formed at a high image formation conveyance velocity on a non-long paper sheet as a transfer paper sheet, and the transfer paper sheet is then read at a reading conveyance velocity that is lower than the image formation conveyance velocity. In this case, the transfer paper sheet is a non-long paper sheet. Therefore, the transfer paper sheet is not to be nipped simultaneously by the image former and the colorimeter, and there is no need to perform control to set the image formation conveyance velocity and the reading conveyance velocity at different values from each other.

In a case where image formation and colorimetry are performed with a long paper sheet as the transfer paper sheet as described above, on the other hand, both the image former and the colorimeter convey the transfer paper sheet while nipping it, and the transfer paper sheet cannot be conveyed at different conveyance velocities during the image formation and during the reading.

SUMMARY

The present invention has been made to solve the above problems, and an object of the present invention is to provide an image forming apparatus, an image forming system, and an image formation control program that are capable of performing appropriate colorimetry on an adjustment image, using a long paper sheet.

To achieve the abovementioned object, according to an aspect of the present invention, an image forming apparatus reflecting one aspect of the present invention comprises an image former that forms an image on a transfer paper sheet; a colorimeter that reads the image formed on the transfer paper sheet; a conveyor that conveys the transfer paper sheet in the image formation at the image former and the reading of the image at the colorimeter; and a controller that controls the formation of the image on the transfer paper sheet, and the reading and the conveyance of the image, wherein when a first conveyance velocity is a velocity at which the transfer paper sheet is conveyed when the image is formed by the image former, and is higher than a velocity set for conveying the transfer paper sheet when the image is read by the colorimeter, a second conveyance velocity is a velocity that is lower than the first conveyance velocity and is set as a velocity at which the transfer paper sheet is conveyed when the image is read by the colorimeter, and a long paper sheet having a longer transfer sheet length in a conveying direction than a predetermined threshold value is used as the transfer paper sheet in an adjustment mode in which an adjustment image formed on the transfer paper sheet is read by the colorimeter, the controller controls the image former and the conveyor, to form the adjustment image on the transfer paper sheet being conveyed at the second conveyance velocity, and controls the colorimeter and the conveyor, to read the adjustment image formed on the transfer paper sheet while the transfer paper sheet is being conveyed at the second conveyance velocity.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6 is a table for explaining image formation according to the embodiment of the present invention;

FIG. 7 is a table for explaining image formation according to the embodiment of the present invention;

FIG. 8 is a table for explaining image formation according to the embodiment of the present invention;

FIG. 9 is a table for explaining image formation according to the embodiment of the present invention;

DETAILED DESCRIPTION OF EMBODIMENTS

Hereinafter, one or more embodiments of the present invention will be described with reference to the drawings. However, the scope of the invention is not limited to the disclosed embodiments.

With reference to the accompanying drawings, the following is a detailed description of an embodiment in which appropriate colorimetry using an adjustment image formed on a long paper sheet is performed in an image forming apparatus 100, an image forming system 1 including the image forming apparatus 100, and an image formation control program for controlling the image forming apparatus 100 and the image forming system 1. Control of operations of the image forming system 1 and the image forming apparatus 100 is performed in accordance with the image formation control program.

[Configuration (1) of an Image Forming System]

Figure 1:
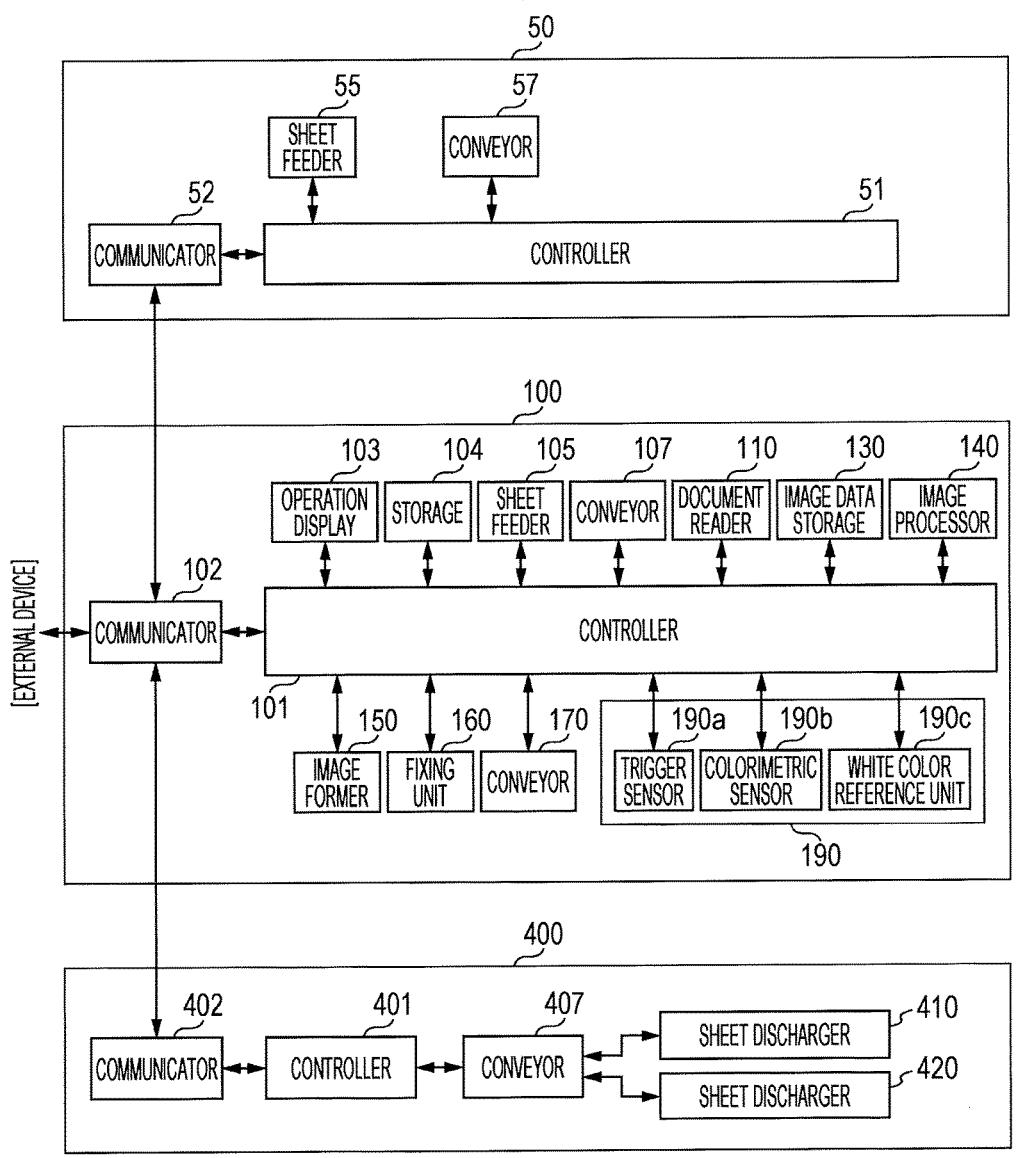
FIG. 1 is a diagram showing the configuration of an image forming apparatus according to an embodiment of the present invention.
Figure 2:
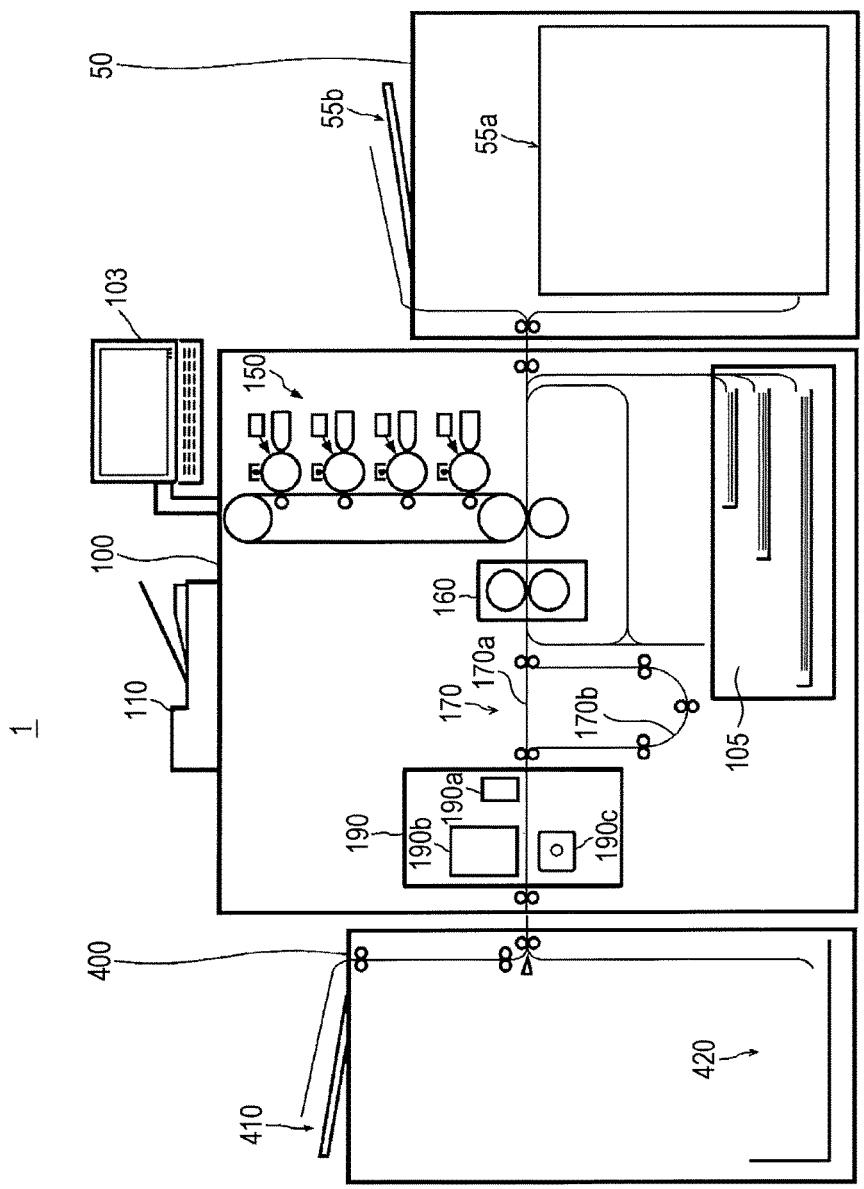
FIG. 2 is a schematic view of the structure of the image forming apparatus according to the embodiment of the present invention.

Referring now to FIGS. 1 and 2, an example configuration of an image forming system 1 in which a sheet feeding device 50, the image forming apparatus 100, and a sheet discharging device 400 are connected is described in detail as a configuration (1) of an image forming system. It should be noted that the image forming system 1 in which the sheet feeding device 50, the image forming apparatus 100, and the sheet discharging device 400 are connected is an example of an image forming system, and other intermediate devices, a post-processing device, and the like that are not shown in the drawings may also be connected thereto in the system.

The sheet feeding device 50 includes a controller 51, a communicator 52, a sheet feeder 55, and a conveyor 57. The controller 51 controls the respective components in the sheet feeding device 50, in accordance with an instruction from a controller 101 that will be described later. The communicator 52 communicates with other devices such as the image forming apparatus 100 that is set in the system. The sheet feeder 55 feeds transfer paper sheets including long paper sheets from a sheet feed tray 55a and a manual feed tray 55b toward the image forming apparatus 100. The conveyor 57 conveys transfer paper sheets inside the sheet feeding device 50.

The image forming apparatus 100 includes a controller 101, a communicator 102, an operation display 103, a storage 104, a sheet feeder 105, a conveyor 107, a document reader 110, an image data storage 130, an image processor 140, an image former 150, a fixing unit 160, a conveyor 170, and a colorimeter 190.

The controller 101 controls the respective components in the image forming apparatus 100. The communicator 102 communicates with other set devices (an external device, the sheet feeding device 50, the sheet discharging device 400, and the like). The operation display 103 accepts an operation input by the user, and displays the state of the image forming apparatus 100. The storage 104 stores various settings. The sheet feeder 105 feeds a transfer paper sheet that is a standard-size, non-long paper sheet or a long paper sheet to the image former 150. The conveyor 107 conveys the transfer paper sheet toward the image former 150 in the image forming apparatus 100. The document reader 110 reads an image of a document with an image sensor, and generates document image data. The image data storage 130 stores image data and various kinds of data to be used when image formation is performed. The image processor 140 performs various kinds of image processing necessary for image formation. The image former 150 forms an image on the transfer paper sheet in accordance with an image formation command and the image data stored in a print image memory in the image data storage 130. The fixing unit 160 stabilizes the toner image formed on the transfer paper sheet, with heat and pressure. The conveyor 170 conveys the transfer paper sheet having the image formed thereon by the image former 150 toward the downstream side, while adjusting the conveyance timing with a conveyor 170a or a conveyor 170b. The colorimeter 190 reads the image on the transfer paper sheet, and generates colorimetric data.

Here, in a colorimetry execution mode, the image former 150 forms an adjustment image on the transfer paper sheet. The adjustment image includes colorimetric patches in different colors and a trigger patch formed so as to have a predetermined positional relationship with the colorimetric patches.

The colorimeter 190 also includes a trigger sensor 190a that reads the trigger patch, a colorimetric sensor 190b that reads the colorimetric patches, and a white color reference unit 190c that corrects the colors read by the colorimetric sensor 190b. In the colorimetry execution mode in the colorimeter 190, with the trigger patch read by the trigger sensor 190a being the reference, the colorimetric sensor 190b reads the colorimetric patches after a predetermined time has elapsed. Further, the colorimetric sensor 190b is formed with a spectrophotometer.

The sheet discharging device 400 includes a controller 401, a communicator 402, a conveyor 407, a sheet discharger 410, and a sheet discharger 420. The controller 401 controls the respective components in the sheet discharging device 400, in accordance with an instruction from the controller 101. The communicator 402 communicates with other devices such as the connected image forming apparatus 100. The conveyor 407 conveys the transfer paper sheet in the sheet discharging device 400. The sheet discharger 410 and the sheet discharger 420 discharge the transfer paper sheet, which is a non-long paper or a long paper sheet sent from the image forming apparatus 100, onto a sheet catch tray.

FIGS. 1 and 2 illustrate a specific example of a case where both non-long paper sheets and long paper sheets are handled as transfer paper sheets in the image forming system 1 formed with the sheet feeding device 50, the image forming apparatus 100, and the sheet discharging device 400. Here, a long paper sheet means a transfer paper sheet having a longer transfer sheet length in the conveying direction than a predetermined threshold value. Specifically, a threshold value is determined in accordance with the distance between the position at which the transfer paper sheet being conveyed is nipped by the image former 150 and the position at which the transfer paper sheet is nipped by the colorimeter 190, and, if the length of the transfer paper sheet in the conveying direction is equal to or greater than the threshold value, the controller 101 determines the transfer paper sheet to be a long paper sheet. That is, in this embodiment, in a case where the transfer paper sheet being conveyed has such a length (the transfer sheet length in the conveying direction) as to extend from the image former 150 to the colorimeter 190, the controller 101 determines the transfer paper sheet to be a long paper sheet.

In FIG. 2, the image former 150 performs image formation with several colors. However, the image former 150 is not limited to this, and may perform monochromatic image formation. Since various structures are conceivable with regard to sheet feeding, image formation, and sheet discharge, FIGS. 1 and 2 show merely an example, and the present invention is not limited to the configuration and mode shown in this specific example.

[Configuration (2) of an Image Forming System]

Figure 3:
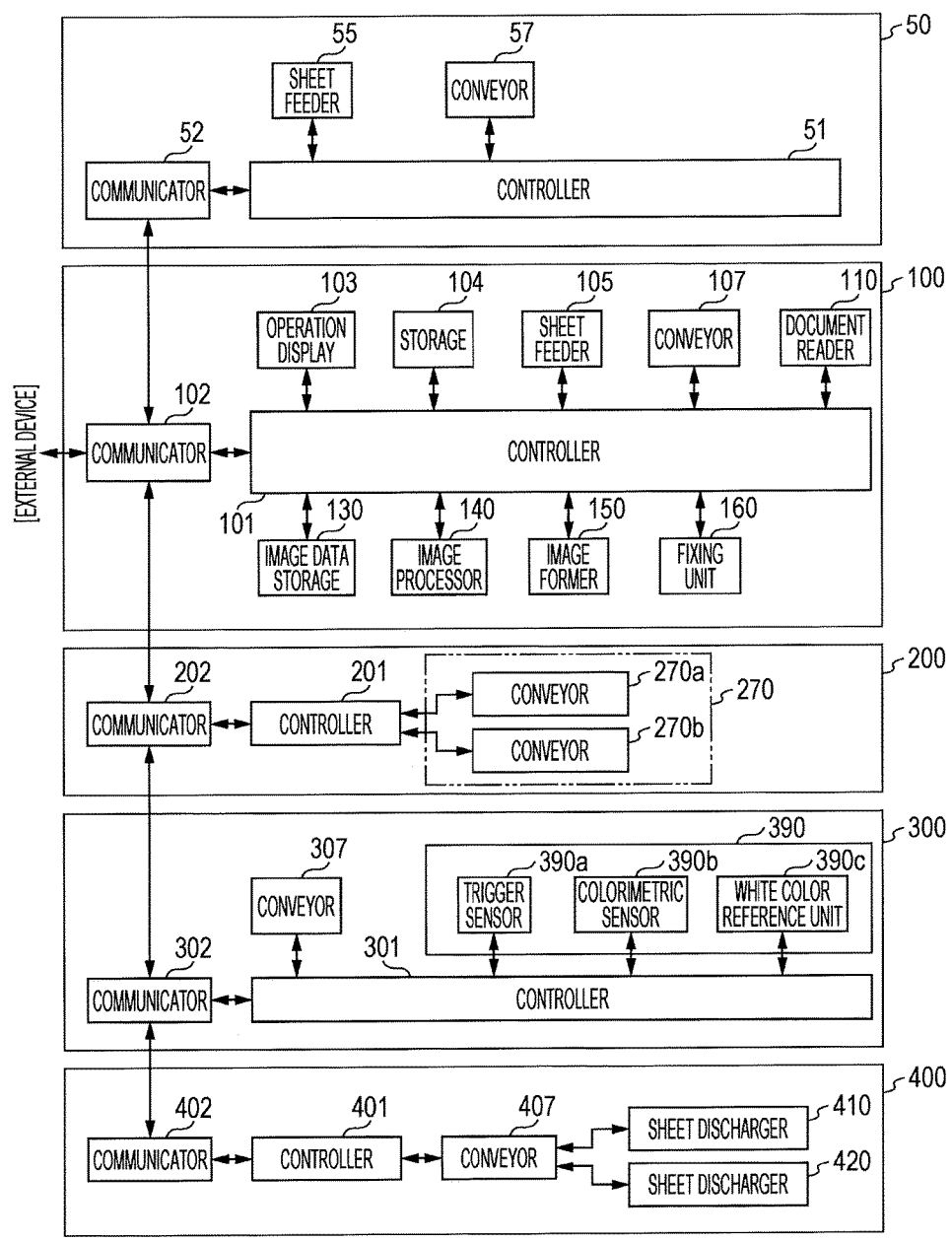
FIG. 3 is a diagram showing the configuration of an image forming system according to the embodiment of the present invention.
Figure 4:
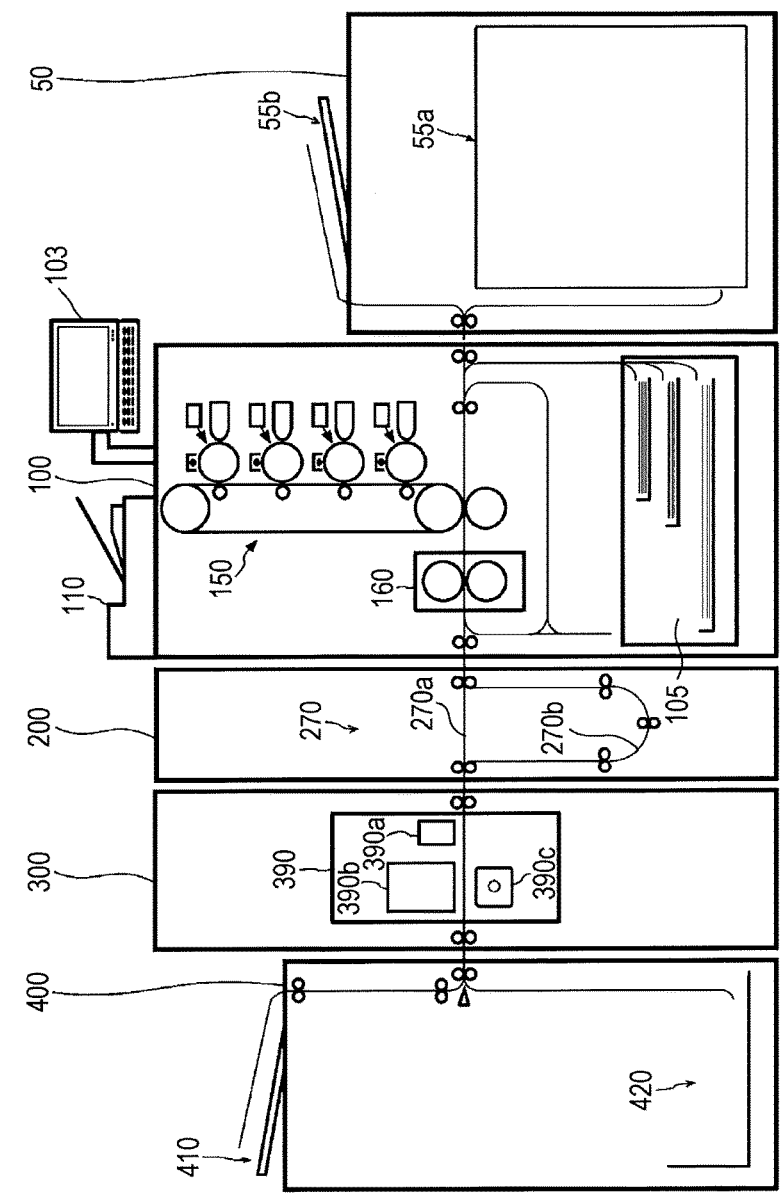
FIG. 4 is a schematic view of the structure of the image forming system according to the embodiment of the present invention.

Referring now to FIGS. 3 and 4, an example configuration of an image forming system 1 in which a sheet feeding device 50, the image forming apparatus 100, an intermediate device 200, a colorimetric device 300, and a sheet discharging device 400 are connected is described in detail as a configuration (2) of an image forming system. It should be noted that the image forming system 1 in which the sheet feeding device 50, the image forming apparatus 100, the intermediate device 200, the colorimetric device 300, and the sheet discharging device 400 are connected is an example of an image forming system, and some other post-processing device and the like that are not shown in the drawings may also be connected thereto in the system.

In FIGS. 3 and 4, the same components as those in FIGS. 1 and 2 are denoted by the same reference numerals as those used in FIGS. 1 and 2, and explanation of them will not be repeated.

The intermediate device 200 includes a controller 201, a communicator 202, and a conveyor 270 (a conveyor 270a and a conveyor 270b). Here, under the control of the controller 201, the conveyor 270 conveys a transfer paper sheet having an image formed thereon by the image forming apparatus 100 toward the colorimetric device 300 on the downstream side, while adjusting the conveyance timing with the conveyor 270a or the conveyor 270b.

The colorimetric device 300 includes a controller 301, a communicator 302, a conveyor 307, and a colorimeter 390. The colorimeter 390 also includes a trigger sensor 390a that reads a trigger patch, a colorimetric sensor 390b that reads colorimetric patches, and a white color reference unit 390c that corrects the colors read by the colorimetric sensor 390b. In a colorimetry execution mode, the colorimeter 390 then reads the image on the transfer paper sheet, and generates colorimetric data, under the control of the controller 301. That is, with the trigger patch read by the trigger sensor 390a being used as a reference, the colorimetric sensor 390b reads the colorimetric patches after a predetermined time has elapsed. The conveyor 307 conveys the transfer paper sheet at the time of colorimetry at a predetermined conveyance velocity. Further, the colorimetric sensor 390b is formed with a spectrophotometer.

FIGS. 3 and 4 illustrate a specific example of a case where both non-long paper sheets and long paper sheets are handled as transfer paper sheets in the image forming system 1 formed with the sheet feeding device 50, the image forming apparatus 100, the intermediate device 200, the colorimetric device 300, and the sheet discharging device 400. Here, a long paper sheet means a transfer paper sheet having a longer transfer sheet length in the conveying direction than a predetermined threshold value. Specifically, a threshold value is determined in accordance with the distance between the position at which the transfer paper sheet being conveyed is nipped by the image former 150 and the position at which the transfer paper sheet is nipped by the colorimeter 390, and, if the length of the transfer paper sheet in the conveying direction is equal to or greater than the threshold value, the transfer paper sheet is determined to be a long paper sheet. That is, in this embodiment, in a case where the transfer paper sheet being conveyed has such a length (the transfer sheet length in the conveying direction) as to extend from the image former 150 to the colorimeter 390, the controller 101 determines the transfer paper sheet to be a long paper sheet.

[Correspondence between the Configurations (1) and (2) of Image Forming Systems]

In short, the conveyor 170 (170a and 170b) in the image forming apparatus 100 in FIGS. 1 and 2 corresponds to the conveyors 270a and 270b in the intermediate device 200. Also, the colorimeter 190 (the trigger sensor 190a, the colorimetric sensor 190b, and the white color reference unit 190c) in the image forming apparatus 100 in FIGS. 1 and 2 corresponds to the colorimeter 390 (the trigger sensor 390a, the colorimetric sensor 390b, and the white color reference unit 390c) in the colorimetric device 300.

[Operation (1) of an Embodiment]

Figure 5:
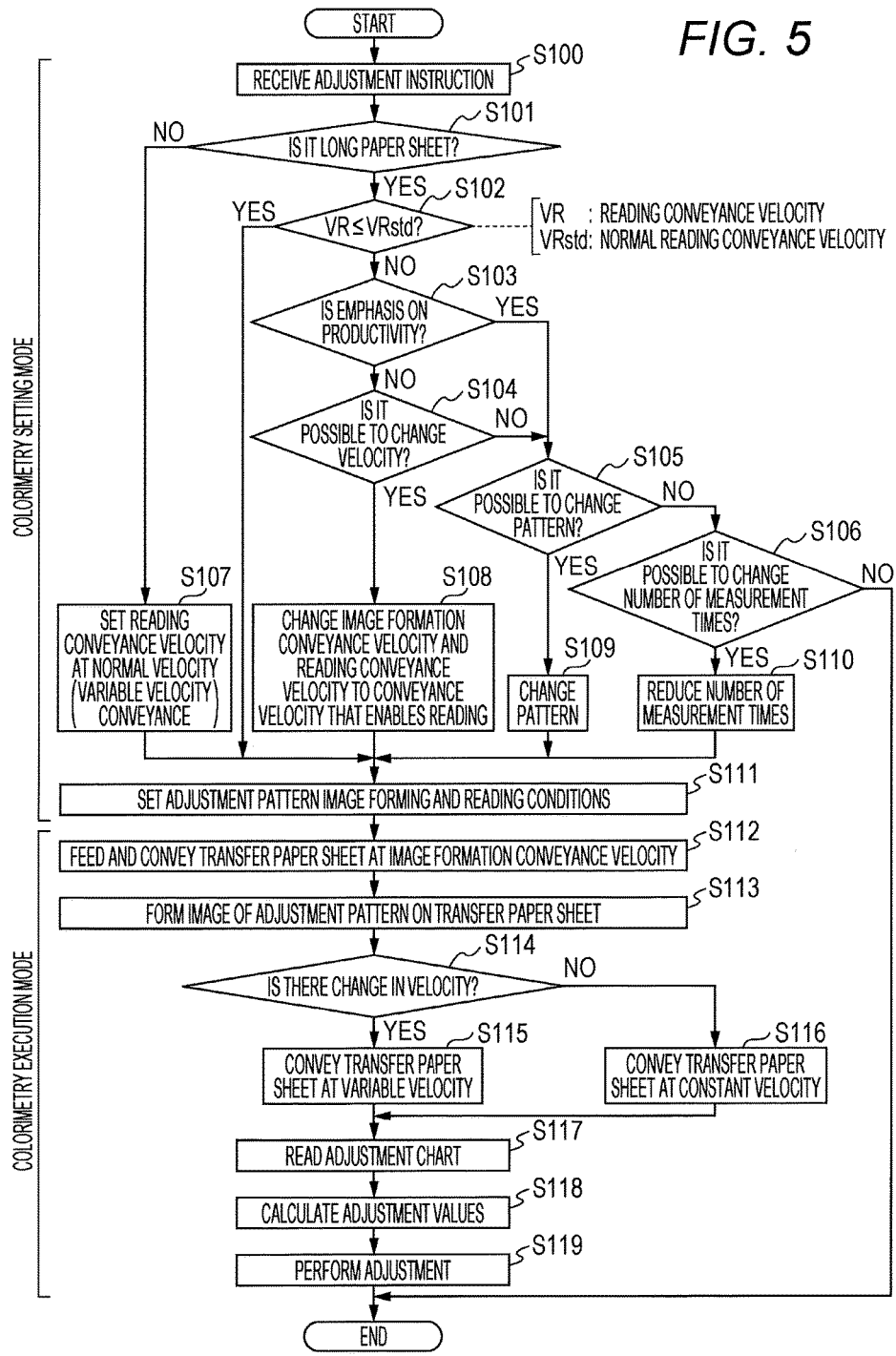
FIG. 5 is a flowchart showing an example operation according to the embodiment of the present invention.

The following is a description of operation of a first embodiment for appropriately conducting colorimetry on an adjustment image using a long paper sheet, with reference to the flowchart in FIG. 5 and the respective explanatory diagrams and tables shown in FIG. 6 and the drawings that follow. In the description below, the image forming system 1 shown in FIGS. 3 and 4 is used as a specific example.

The controller 101 receives an instruction as to an adjustment mode and the tray to be used, from a user via the operation display 103 (step S100 in FIG. 5).

As for adjustment modes, whether to use the colorimeter 390 and an adjustment pattern number are associated with each adjustment mode, as shown in the table shown in FIG. 6. Therefore, the controller 101 reads, from the storage 104, the adjustment pattern image data corresponding to the adjustment pattern number corresponding to the adjustment mode designated by the user. In this embodiment, an example case where density adjustment or color adjustment is performed is described.

As for the tray to be used for adjustment, information about paper sizes, paper types, basis weights, and image formation conveyance velocities is stored and associated with the respective trays, as shown in the table in FIG. 7. Therefore, the image formation conveyance velocity is provisionally determined in accordance with the tray designated for adjustment by the user. In this case, a tray 1, a tray 2, a tray 3, a tray 4, a manual feed tray, an external transfer sheet roll, and the like are stored in the table. It should be noted that the image formation conveyance velocity is set at an initial velocity at which stable fixing can be performed, in accordance with the type of paper and the basis weight. Further, as will be described later, the image formation conveyance velocity may be changed due to the relationship with the reading conveyance velocity for adjustment.

As for the high, intermediate, and low image formation conveyance velocities shown in the table in FIG. 7, specific velocities are stored in the table in FIG. 8. In this example case, the high velocity is 450 mm/s, the intermediate velocity is 300 mm/s, and the low velocity is 180 mm/s. In a case where a threshold value is determined in accordance with the distance between the position at which the transfer paper sheet being conveyed is nipped by the image former 150 and the position at which the transfer paper sheet is nipped by the colorimeter 390, and, if the length of the transfer paper sheet in the conveying direction is equal to or greater than the threshold value, the transfer paper sheet is determined to be a long paper sheet. For example, the distance between the transfer sheet nipper of the image former 150 and the transfer sheet nipper of the colorimeter 390 is 480 mm in this case. This value may change depending on the configurations of the apparatus and the system. At this stage, the threshold value is set at 480 mm (or a value around 480 mm). In this case, according to the table of FIG. 7, the tray 4 (630 mm in the conveying direction), the manual feed tray (750 mm in the conveying direction), and the external transfer sheet roll (2000 m in the conveying direction) are equal to or longer than the above threshold value, and accordingly, are regarded as long paper sheets in this embodiment.

Further, the reading conveyance velocity for each transfer paper sheet to be used for adjustment is set as shown in the table in FIG. 9. The spectrophotometer used as the colorimetric sensor 390b emits light rays of various wavelengths toward a colorimetric patch to obtain a spectrum of reflected light, and the same colorimetric patch needs to be measured more than once. For this reason, the reading conveyance velocities and the numbers of times one colorimetric patch is to be read are set as shown in FIG. 9.

In a case where the transfer paper sheet is a non-long paper sheet according to the table shown in FIG. 9, the transfer paper sheet being conveyed does not extend from the image former 150 to the colorimeter 390, and thus, the conveyor 270b in the intermediate device 200 can change the conveyance velocity. In this case, regardless of the image formation conveyance velocity, the reading conveyance velocity VR is set at 330 mm/s, which is the normal reading conveyance velocity VRstd, and the number of times one colorimetric patch is to be read is set at five, which is a predetermined number of times.

Further, in a case where the transfer paper sheet is a long paper sheet according to the table in FIG. 9, the transfer paper sheet being conveyed extends from the image former 150 and the colorimeter 390, and therefore, the image formation conveyance velocity and the reading conveyance velocity need to be the same. In this case, if the transfer sheet reading mode is a long sheet mode, and the reading conveyance velocity depends on the image formation conveyance velocity (intermediate velocity), the number of times one colorimetric patch is to be read is five, which is the predetermined number of times. Also, in a case where the transfer paper sheet is a long paper sheet according to the table in FIG. 9, if the transfer sheet reading mode is a long sheet mode (however, the adjustment pattern is elongated in the sub-scanning direction), and the reading conveyance velocity depends on the image formation conveyance velocity (high velocity), the number of times one colorimetric patch is to be read is set at five, which is the predetermined number of times. Further, in a case where the transfer paper sheet is a long paper sheet according to the table in FIG. 9, if the transfer sheet reading mode is a long sheet mode, and the reading conveyance velocity depends on the image formation conveyance velocity (high velocity), the number of times one colorimetric patch is to be read is set at three, which is less than the predetermined number of times.

The description now returns to the operation shown in the flowchart. At this stage, the controller 101 determines whether the transfer paper sheet to be used for adjustment as instructed by the user is a long paper sheet or a non-long paper sheet, by referring to the information about transfer paper sheets shown in FIG. 7 and other tables (step S101 in FIG. 5). It should be noted that the transfer paper sheet is determined to be a long paper sheet if the transfer sheet length in the conveying direction of the transfer paper sheet is equal to or greater than the threshold value, in a case where the transfer paper sheet being conveyed has a length equal to or greater than such a predetermined length as to extend from the image former 150 to the colorimeter 390, that is, where the threshold value is determined in accordance with the distance between the position at which the transfer paper sheet is nipped by the image former 150 and the position at which the transfer paper sheet is nipped by the colorimeter 390, as described above.

If the transfer paper sheet to be used for adjustment is a non-long paper sheet (NO in step S101 in FIG. 5), the controller 101 sets the reading conveyance velocity VR at the normal reading conveyance velocity VRstd (330 mm/s in FIG. 9) (step S107 in FIG. 5), and moves on to step S111 and the later steps.

If the length of the transfer paper sheet to be used for adjustment is equal to or greater than the predetermined threshold value in the conveying direction, on the other hand, the transfer paper sheet is a long paper sheet having a length equal to or greater than the predetermined length (YES in step S101 in FIG. 5), and the reading conveyance velocity VR depends on the image formation conveyance velocity VW. Therefore, the controller 101 determines whether the reading conveyance velocity VR is equal to or lower than the normal reading conveyance velocity VRstd (VR≤VRstd) (step S102 in FIG. 5).

If VR≤VRstd (YES in step S102 in FIG. 5), it is possible to read the adjustment image with the colorimeter 390 without any problem, and there is no need to change the settings. Therefore, the operation moves on to step S111 and the later steps, which will be described later.

If VR is greater than VRstd (NO in step S102 in FIG. 5), on the other hand, there is a problem in reading the adjustment image with the colorimeter 390 as it is. Therefore, to make various adjustments described later, the controller 101 determines whether emphasis is put on productivity as another setting (step S103 in FIG. 5).

If VR is greater than VRstd (NO in step S102 in FIG. 5), and emphasis is not put on productivity (NO in step S103 in FIG. 5), the image formation conveyance velocity may be changed to a lower velocity in some cases, since productivity is not important. Therefore, the controller 101 determines whether the image formation conveyance velocity (see FIG. 8) can be changed to a lower velocity (step S104 in FIG. 5).

If VR is greater than VRstd (NO in step S102 in FIG. 5), emphasis is not put on productivity (NO in step S103 in FIG. 5), and the image formation conveyance velocity can be changed to a lower velocity (YES in step S104 in FIG. 5), the controller 101 changes the image formation conveyance velocity and the reading conveyance velocity to a conveyance velocity equal to or lower than the normal reading conveyance velocity (330 mm/s in FIG. 9) at the colorimeter 390 (step S108 in FIG. 5). In the cases shown in the tables in FIG. 8 and FIG. 9, both the image formation conveyance velocity and the reading conveyance velocity are set at an intermediate image formation conveyance velocity of 300 mm/s, which is equal to or lower than the normal reading conveyance velocity VRstd of 330 mm/s.

If VR is greater than VRstd (NO in step S102 in FIG. 5), and emphasis is put on productivity (YES in step S103 in FIG. 5), or if VR is greater than VRstd (NO in step S102 in FIG. 5), and emphasis is put on productivity (YES in step S103 in FIG. 5), but the image formation conveyance velocity cannot be changed to a lower velocity (NO in step S104 in FIG. 5), on the other hand, the controller 101 checks whether the adjustment pattern can be changed (elongated) so that one colorimetric patch can be read a predetermined number of times (five times per colorimetric patch, for example) even in a situation where the reading conveyance velocity VR is higher than the normal reading conveyance velocity VRstd, or whether the transfer sheet length is long enough for image formation after the adjustment pattern is elongated (step S105 in FIG. 5). It should be noted that the number of times reading has been performed at the colorimeter 390 can be converted into the reading time. Therefore, in a case where the conveyance velocity is 1.2 times the normal reading conveyance velocity VRstd, it is necessary to form an adjustment pattern for a colorimetric patch elongated (enlarged) 1.2 times in the conveying direction.

If the transfer sheet length is long enough for image formation after the adjustment pattern is changed so that one colorimetric patch can be read the predetermined number of times even in a situation where the reading conveyance velocity VR is higher than the normal reading conveyance velocity VRstd (YES in step S105 in FIG. 5), the controller 101 determines to elongate each patch in the adjustment pattern in the conveying direction (step S109 in FIG. 5). As described above, the controller 101 determines the elongation rate for the adjustment pattern, from the ratio between the image formation conveyance velocity VW to be actually used and the normal reading conveyance velocity VRstd.

Meanwhile, in a case where VR is greater than VRstd (NO in step S102 in FIG. 5), and emphasis is put on productivity (YES in step S103 in FIG. 5), or where VR is greater than VRstd (NO in step S102 in FIG. 5), and emphasis is put on productivity (YES in step S103 in FIG. 5), but the image formation conveyance velocity cannot be changed to a lower velocity (NO in step S104 in FIG. 5), if the transfer sheet length is not long enough for image formation after the adjustment pattern is changed (the colorimetric patch is elongated) so that the colorimetric patch can be read the predetermined number of times (five times per colorimetric patch, for example) even in a situation where the reading conveyance velocity VR is higher than the normal reading conveyance velocity VRstd (NO in step S105 in FIG. 5), the controller 101 checks whether it is possible to change the number of times reading is to be performed (from five times per colorimetric patch to three times per colorimetric patch, for example) in a situation where the reading conveyance velocity is higher than the normal reading conveyance velocity (step S106 in FIG. 5).

If the predetermined number of reading is to be performed at the normal reading conveyance velocity is five, and reading can be performed three times (60% of the normal number of times) or four times (80% of the normal number of times) in a situation where the reading conveyance velocity is higher than the normal reading conveyance velocity, reading of the adjustment pattern with a certain degree of accuracy is considered possible, and the controller 101 determines that it is possible to change the number of times reading is to be performed. As for the threshold such as 60% or 80% (the lower limit value for the number of times reading is to be performed) in this case, it is possible to set the threshold at a desired value, taking into account a decrease in measurement accuracy and the necessary accuracy.

If the number of times reading is to be performed in a situation where the reading conveyance velocity VR is higher than the normal reading conveyance velocity VRstd can be changed from "five times per colorimetric patch" to "three times per colorimetric patch", for example (YES in step S106 in FIG. 5), the controller 101 determines to reduce the number of times reading is to be performed on each colorimetric patch in the adjustment pattern (step S110 in FIG. 5).

If the changed number of times reading is to be performed is smaller than the lower limit value for the number of times reading is to be performed in a situation where the reading conveyance velocity VR is higher than the normal reading conveyance velocity VRstd (NO in step S106 in FIG. 5), the accuracy required for adjustment cannot be achieved. Therefore, the controller 101 determines to stop the adjustment (END in FIG. 5).

In the above manner, the controller 101 receives an adjustment instruction from the user (step S100 in FIG. 5), and accordingly determines the reading conveyance velocity VR (step S107 in FIG. 5), determines the image formation conveyance velocity VW and the reading conveyance velocity VR (step S108 in FIG. 5), determines to change the adjustment pattern (step S109 in FIG. 5), and changes the number of times reading is to be performed on one colorimetric patch in the adjustment pattern (step S110 in FIG. 5).

In accordance with the above determination, the controller 101 sets the condition for image formation of the adjustment pattern on a transfer paper sheet and the condition for reading the adjustment pattern formed on the transfer paper sheet in each component of the image forming system 1 (step S111 in FIG. 5).

Specifically, as the adjustment pattern image formation and reading conditions, the controller 101 sets the image formation conveyance velocity VW at the conveyor 107 and the image former 150, sets the conveyance velocity at a time of variable velocity conveyance or invariable velocity conveyance at the conveyor 270 via the controller 201, sets the reading conveyance velocity VR at the conveyor 307 and the colorimeter 390 via the controller 301, and sets the conveyance velocity at the conveyor 407 via the controller 401.

Figure 10:
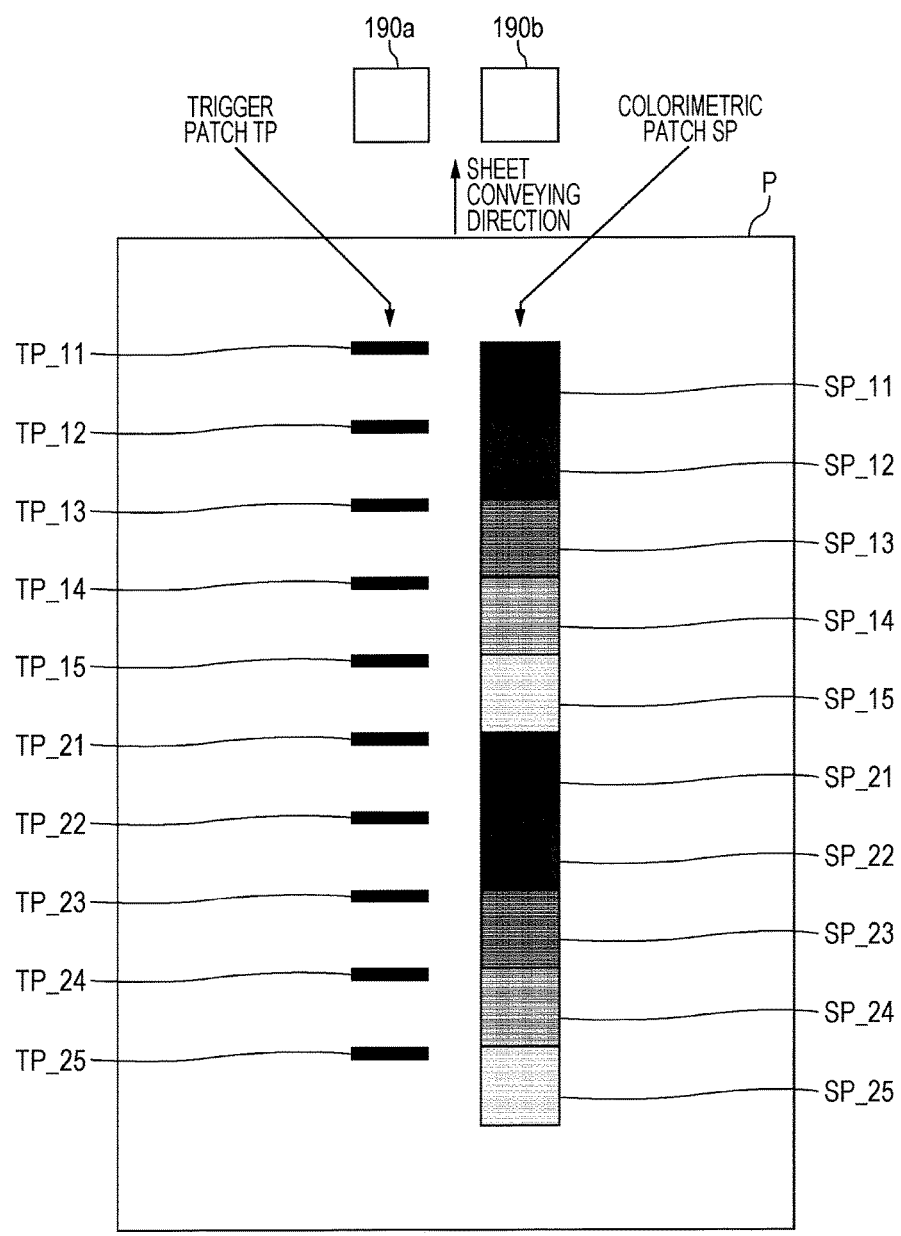
FIG. 10 is an explanatory diagram schematically showing image formation according to the embodiment of the present invention.
Figure 11:
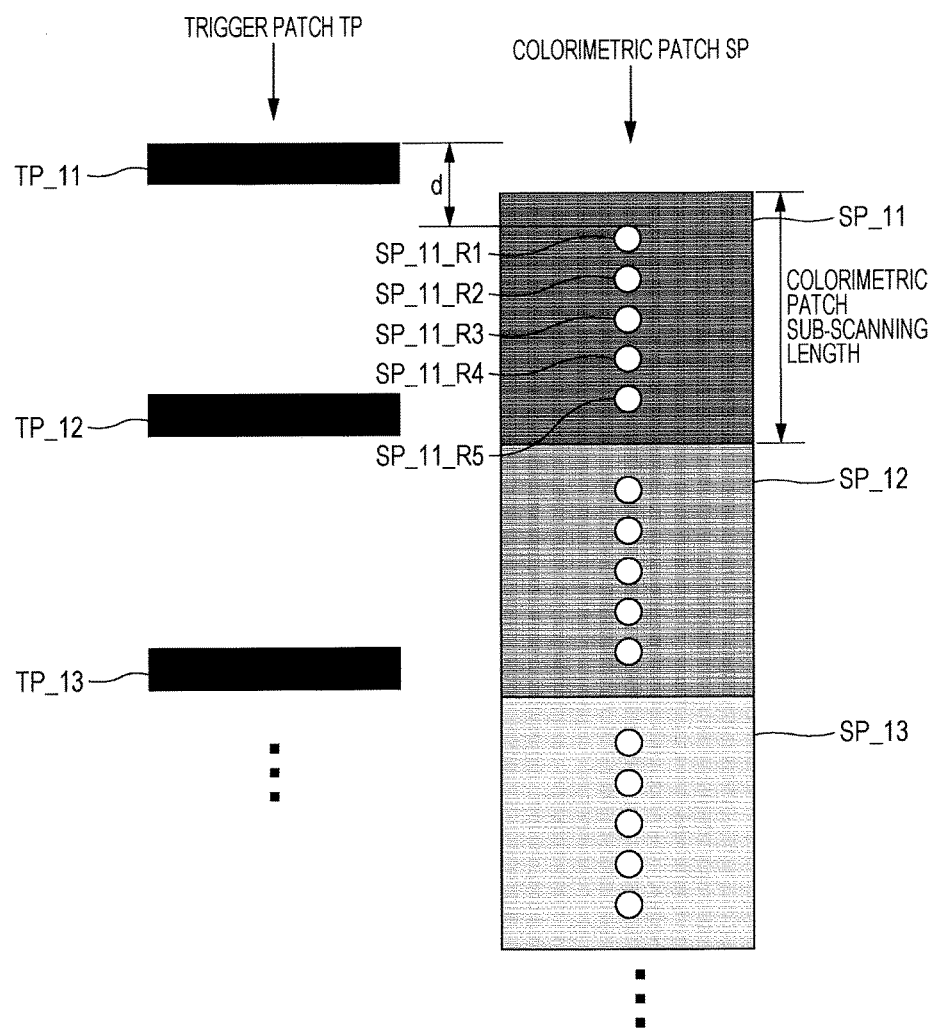
FIG. 11 is an explanatory diagram schematically showing image formation according to the embodiment of the present invention.
Figure 12:
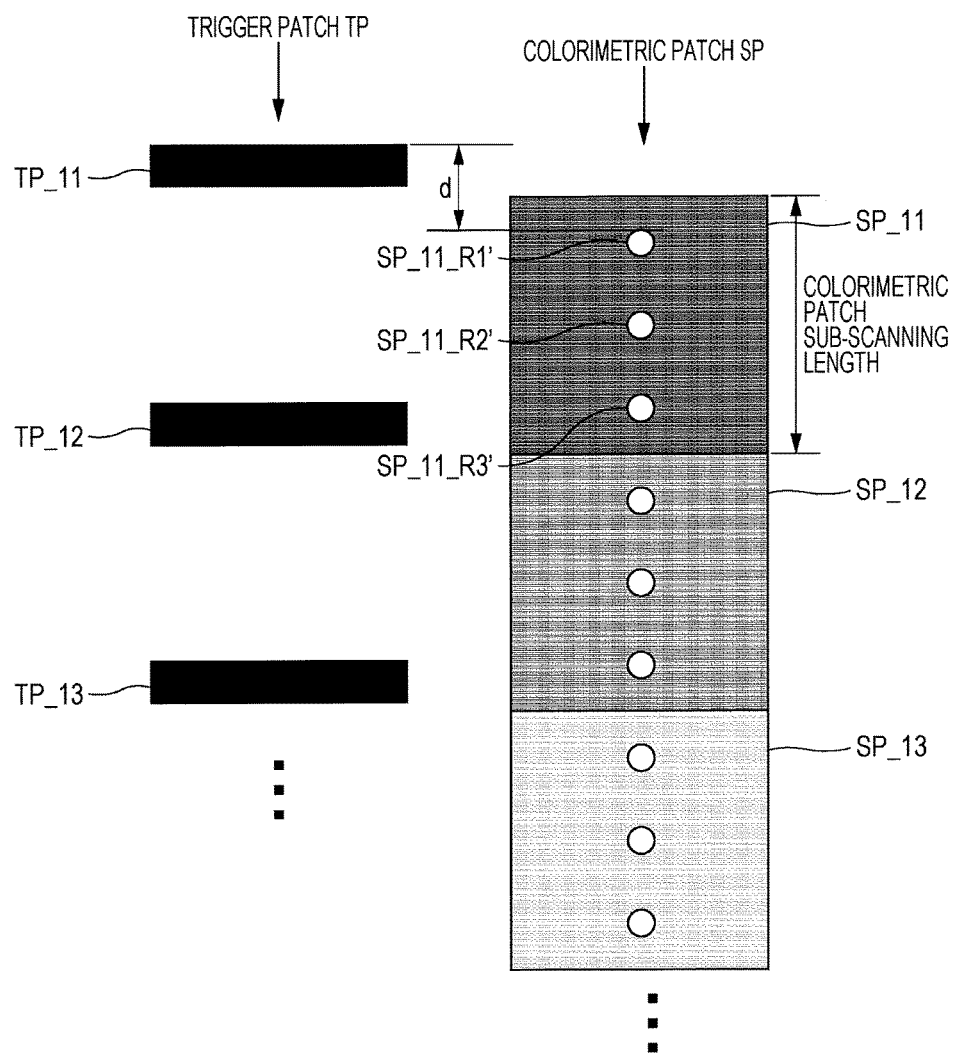
FIG. 12 is an explanatory diagram schematically showing image formation according to an embodiment of the present invention.

Also, in accordance with the above determination, the controller 101 determines, as the condition for reading the adjustment pattern formed on the transfer paper sheet, the position of a trigger patch TP_11 by calculating the read delay distance d (see FIG. 11) between the trigger patch TP_11 to be first read in the adjustment pattern (see FIGS. 10 and 11) and the colorimetric patch SP_11 to be first read in the adjustment pattern on the transfer paper sheet (see FIGS. 10 and 11), from the reading conveyance velocity and the length of a colorimetric patch in the adjustment pattern in the sub-scanning direction. The controller 101 then notifies the image former 150 of the position of the trigger patch TP_11. In a case where the number of times reading is to be performed on one colorimetric patch is reduced, the controller 101 also determines the position of the trigger patch TP_11 by calculating the read delay distance d (see FIG. 11) in the same manner as above, as shown in FIG. 12, and then notifies the image former 150 of the position.

Instead of determining the read delay distance d from the reading conveyance velocity and the length of the colorimetric patch in the adjustment pattern in the sub-scanning direction, it is possible to change the time Td since the detection of a trigger patch till the start of reading of a colorimetric patch in accordance with the reading conveyance velocity and the length of the colorimetric patch in the adjustment pattern in the sub-scanning direction, while maintaining the read delay distance d at a constant value.

In accordance with the above determination, the controller 101 also notifies the colorimeter 390 of the number of times reading is to be performed on one colorimetric patch as the condition for reading the adjustment pattern, and instructs the colorimeter 390 to prepare for the reading.

Figure 13:
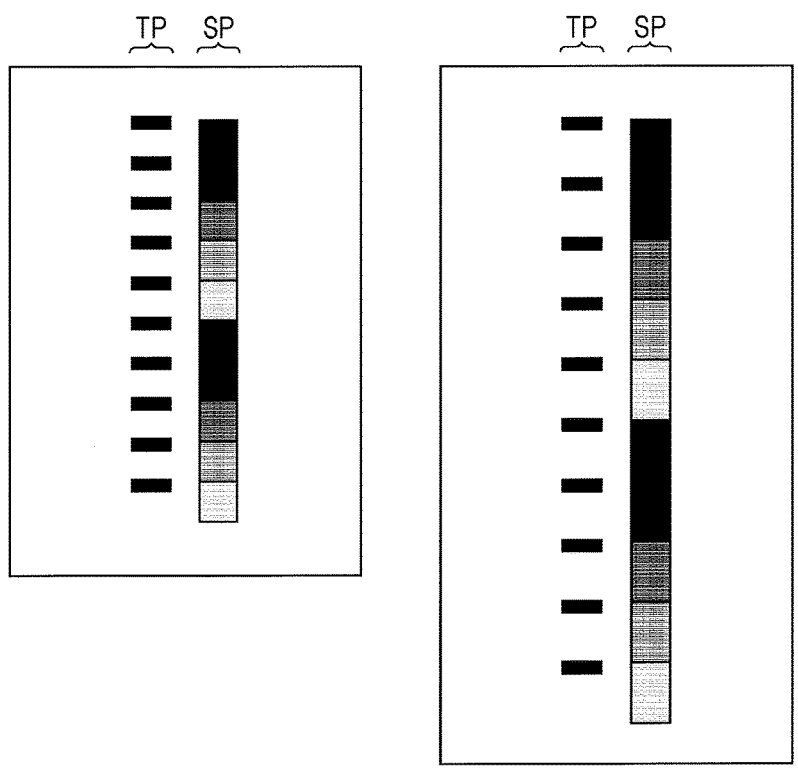
FIGS. 13A and 13B are explanatory diagrams schematically showing image formation according to the embodiment of the present invention.

Further, in accordance with the above determination, as the condition for image formation of the adjustment pattern, the controller 101 supplies the image former 150 with the data of a standard adjustment pattern or the data of an elongated adjustment pattern, depending on whether the adjustment pattern is determined to be changed (step S109 in FIG. 5). FIG. 13A shows a specific example of a normal adjustment pattern, and FIG. 13B shows a specific example of an adjustment pattern determined as an elongated colorimetric patch in changing the pattern (step S109 in FIG. 5).

After the various conditions are set in each component (step S111 in FIG. 5) as described above, a transfer paper sheet is supplied from the sheet feeder 105 or the sheet feeder 55 in accordance with an instruction from the controller 101 and is conveyed at the image formation conveyance velocity (step S112 in FIG. 5), and the image former 150, which has received an instruction from the controller 101, forms the adjustment pattern on the transfer paper sheet (step S113 in FIG. 5).

Here, the conveyor 107 conveys the transfer paper sheet in the image forming apparatus 100, the conveyor 270 (270a or 270b) conveys the transfer paper sheet in the intermediate device 200, and the conveyor 307 conveys the transfer paper sheet in the colorimetric device 300.

At this stage, if the image formation conveyance velocity and the reading conveyance velocity are different in a case where the transfer paper sheet is a non-long paper sheet (YES in step S114 in FIG. 5), the conveyor 270b in the intermediate device 200 switches from the image formation conveyance velocity to the reading conveyance velocity (step S115 in FIG. 5), and sends the transfer paper sheet to the colorimetric device 300. Also at this stage, if the transfer paper sheet is a long paper sheet, and the image formation conveyance velocity and the reading conveyance velocity are the same (NO in step S114 in FIG. 5), the conveyor 270a in the intermediate device 200 sends the transfer paper sheet to the colorimetric device 300 without a change in the conveyance velocity.

After the transfer paper sheet having the adjustment pattern formed thereon is conveyed to the colorimeter 390 in the colorimetric device 300, the trigger sensor 390a first detects a trigger patch TP as the reading start mark.

When the predetermined time Td during which conveyance is performed at the reading conveyance velocity over the read delay distance d has passed since the detection of the trigger patch TP by the trigger sensor 390a, the controller 301 supplies the colorimetric sensor 390b with a trigger signal as an instruction to start the reading of a colorimetric patch SP.

After receiving the trigger signal, the colorimetric sensor 390b reads the colorimetric patch a predetermined number of times at regular intervals (step S117 in FIG. 5). The number of times reading is to be performed on one colorimetric patch by the colorimetric sensor 390b is the predetermined number of times or the number of times changed in step S110 in FIG. 5 (see FIG. 9). Thereafter, reading a colorimetric patch with the colorimetric sensor 390b is repeated every time a trigger patch is detected by the trigger sensor 390a.

When reading of all the trigger patches and colorimetric patches of the adjustment pattern on the transfer paper sheet is completed, the result of the reading of each colorimetric patch with the colorimetric sensor 390b is transmitted from the controller 301 to the controller 101 via the communicator 302, the communicator 202, and the communicator 102.

The controller 101 receives the results of the reading of all the colorimetric patches, compares the results of the reading the colorimetric patch with a reference value, analyzes comparison results, and calculates adjustment values for colors, densities, and the like for the image former 150 (step S118 in FIG. 5). Using the calculated adjustment values, the controller 101 then adjusts each of the components of the image former 150 to an appropriate image forming state (step S119 in FIG. 5). In this case, the states of the respective components for charging, exposure, development, transfer, and the like in the image former 150 are adjusted by a known adjustment method.

In the above operation, in a case where a long paper sheet is used for adjustment, it is necessary to match the reading conveyance velocity to the image formation conveyance velocity. In a case where the reading conveyance velocity is higher than the normal reading conveyance velocity, the image formation conveyance velocity and the reading conveyance velocity are changed to a conveyance velocity equal to or lower than the normal reading conveyance velocity (step S108 in FIG. 5). Thus, colorimetry using a long paper sheet can be appropriately performed on the adjustment image.

Also, in the above operation, in a case where a long paper sheet is used for adjustment, it is necessary to match the reading conveyance velocity to the image formation conveyance velocity. In a case where the reading conveyance velocity is higher than the normal reading conveyance velocity, but the image formation conveyance velocity and the reading conveyance velocity cannot be changed, each patch in the adjustment pattern is elongated in the conveying direction (step S109 in FIG. 5). Thus, colorimetry using a long paper sheet can be appropriately performed on the adjustment image.

Also, in the above operation, in a case where a long paper sheet is used for adjustment, it is necessary to match the reading conveyance velocity to the image formation conveyance velocity. In a case where the reading conveyance velocity is higher than the normal reading conveyance velocity, but the image formation conveyance velocity and the reading conveyance velocity cannot be changed and each patch in the adjustment pattern cannot be elongated, the number of times reading is to be performed on one colorimetric patch in the adjustment pattern is reduced (step S110 in FIG. 5). Thus, colorimetry using a long paper sheet can be appropriately performed on the adjustment image.

In the above operation, in a case where a long paper sheet is used for adjustment, it is necessary to match the reading conveyance velocity to the image formation conveyance velocity. In a case where the reading conveyance velocity is higher than the normal reading conveyance velocity, but it is not possible to change the image formation conveyance velocity and the reading conveyance velocity and elongate each patch in the adjustment pattern, and further, the reduced number of times reading is to be performed on one colorimetric patch in the adjustment pattern is smaller than a predetermined threshold value, a determination is made to stop the adjustment. Thus, adjustment with low accuracy can be prevented.

[Operation (2) of an Embodiment]

Figure 14:
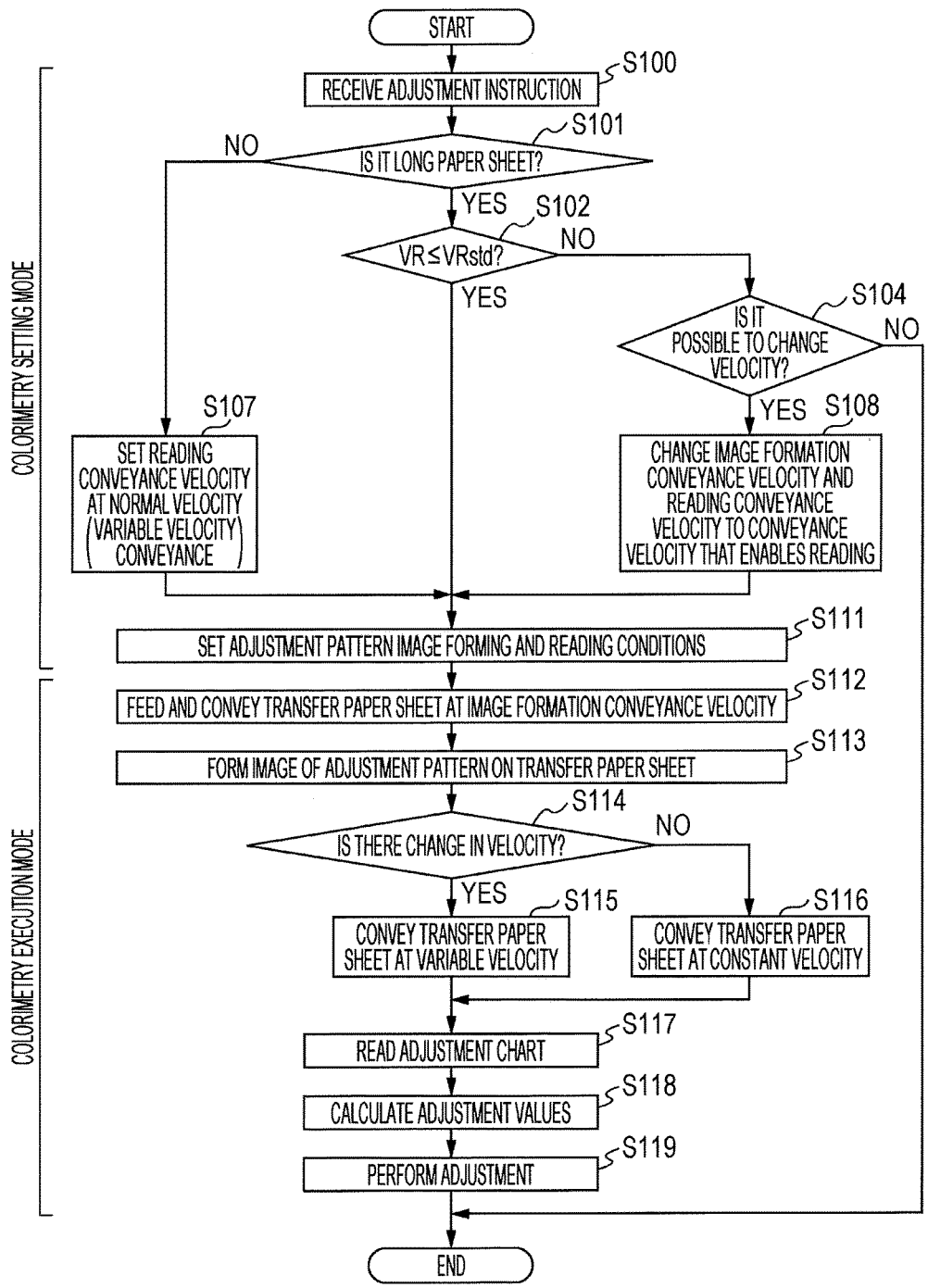
FIG. 14 is a flowchart showing an example operation according to an embodiment of the present invention.

The following is a description of operation of a second embodiment for appropriately conducting colorimetry on an adjustment image using a long paper sheet, with reference to the flowchart in FIG. 14. In the flowchart (FIG. 14) for explaining the second embodiment, the same procedures as those in the flowchart (FIG. 5) in the first embodiment are denoted by the same step numbers as those used in FIG. 5, and therefore, explanation thereof is not made herein. In the description of the second embodiment below, the different aspects from the first embodiment will be mainly explained.

In a case where the transfer paper sheet designated for adjustment by the user (step S100 in FIG. 14) is a long paper sheet (YES in step S101 in FIG. 5), and the reading conveyance velocity VR depending on the image formation conveyance velocity VW is higher than the normal reading conveyance velocity VRstd (VR>VRstd) (NO in step S102 in FIG. 5), if the image formation conveyance velocity can be changed to a lower velocity (YES in step S104 in FIG. 5), the controller 101 changes the image formation conveyance velocity and the reading conveyance velocity to a conveyance velocity equal to or higher than the normal reading conveyance velocity (330 mm/s in FIG. 9) at the colorimeter 390 (step S108 in FIG. 5).

In a case where the transfer paper sheet designated for adjustment by the user (step S100 in FIG. 14) is a long paper sheet (YES in step S101 in FIG. 5), and the reading conveyance velocity VR depending on the image formation conveyance velocity VW is higher than the normal reading conveyance velocity VRstd (VR>VRstd) (NO in step S102 in FIG. 5), if the image formation conveyance velocity cannot be changed to a lower velocity (NO in step S104 in FIG. 5), on the other hand, the controller 101 determines to stop the adjustment, as reading cannot be performed at the colorimetric device 300 (END in FIG. 5).

Thereafter, the respective components are controlled to set conditions therein, form and read an image of the adjustment pattern, calculate adjustment values, and perform the adjustment (steps S111 through S119 in FIG. 14), as in the first embodiment.

In the above operation, in a case where a long paper sheet is used for adjustment, it is necessary to match the reading conveyance velocity to the image formation conveyance velocity. In a case where the reading conveyance velocity is higher than the normal reading conveyance velocity (NO in step S102 in FIG. 14), the image formation conveyance velocity and the reading conveyance velocity are changed to a conveyance velocity equal to or lower than the normal reading conveyance velocity (step S108 in FIG. 14). Thus, colorimetry using a long paper sheet can be appropriately performed on the adjustment image.

In the above operation, in a case where a long paper sheet is used for adjustment, it is necessary to match the reading conveyance velocity to the image formation conveyance velocity. In a case where the reading conveyance velocity is higher than the normal reading conveyance velocity (NO in step S102 in FIG. 14), if the image formation conveyance velocity and the reading conveyance velocity cannot be changed to a conveyance velocity equal to or lower than the normal reading conveyance velocity (NO in step S104 in FIG. 14), a determination is made to stop the adjustment. Thus, adjustment with low accuracy can be prevented.

Other Embodiments

In the specific example described above, the image forming system 1 shown in FIGS. 3 and 4 is used. However, the image forming apparatus 100 in the image forming system 1 shown in FIGS. 1 and 2 can appropriately perform colorimetry on an adjustment image formed a long paper sheet through the same operation as above.

Further, the specific numerical values and conditions used in the above description are mere examples, and the numerical values and conditions are not limited to those mentioned above. It is possible to use any desired numerical values and conditions, and colorimetry can be appropriately performed on the adjustment image formed on a long paper sheet.

The calculation of adjustment values (step S118 in FIG. 5) after the adjustment image is read from the long paper sheet, and the adjustment of the image former 150 (step S119 in FIG. 5) can be performed with a controller other than the controller 101, or an external device.

Although a cut paper sheet is used as a long paper sheet in FIGS. 1 through 4 designed for explaining the above embodiments, the present invention is not limited to that.

Figure 15:
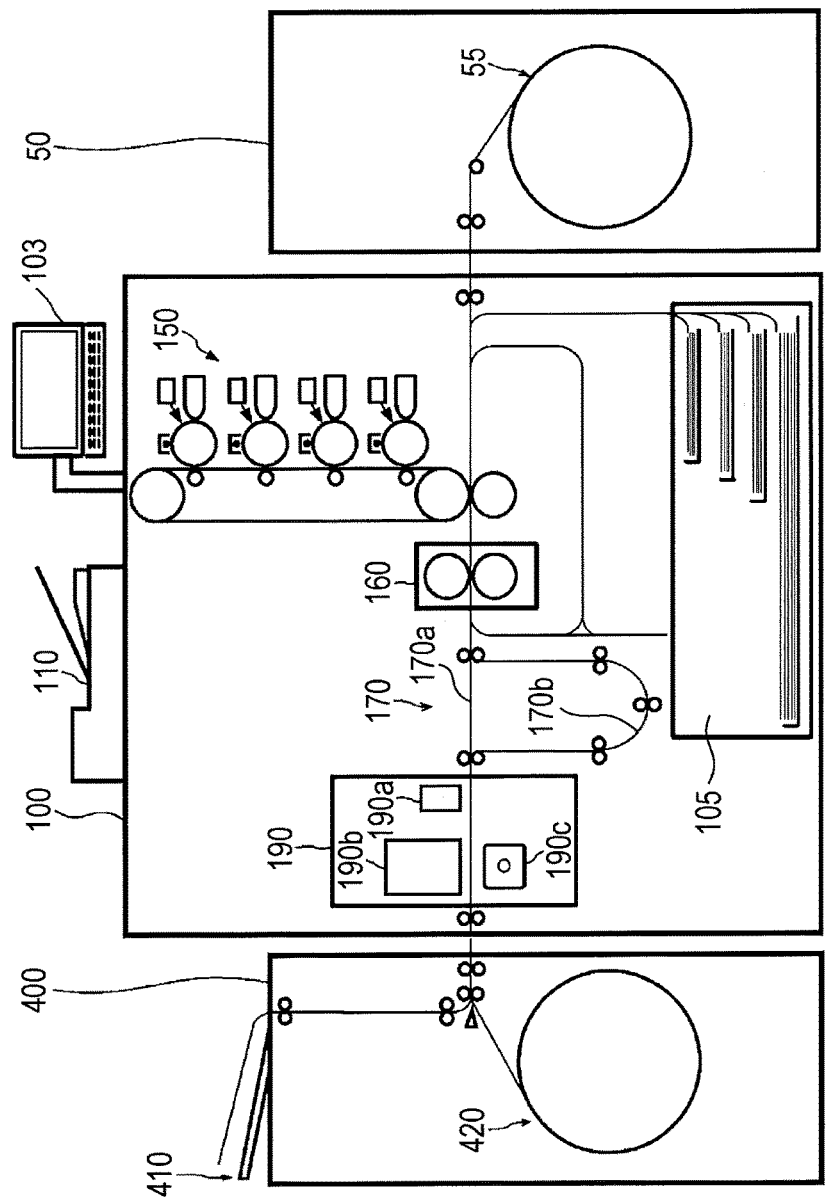
FIG. 15 is a schematic view of the structure of an image forming apparatus according to the embodiment of the present invention.
Figure 16:
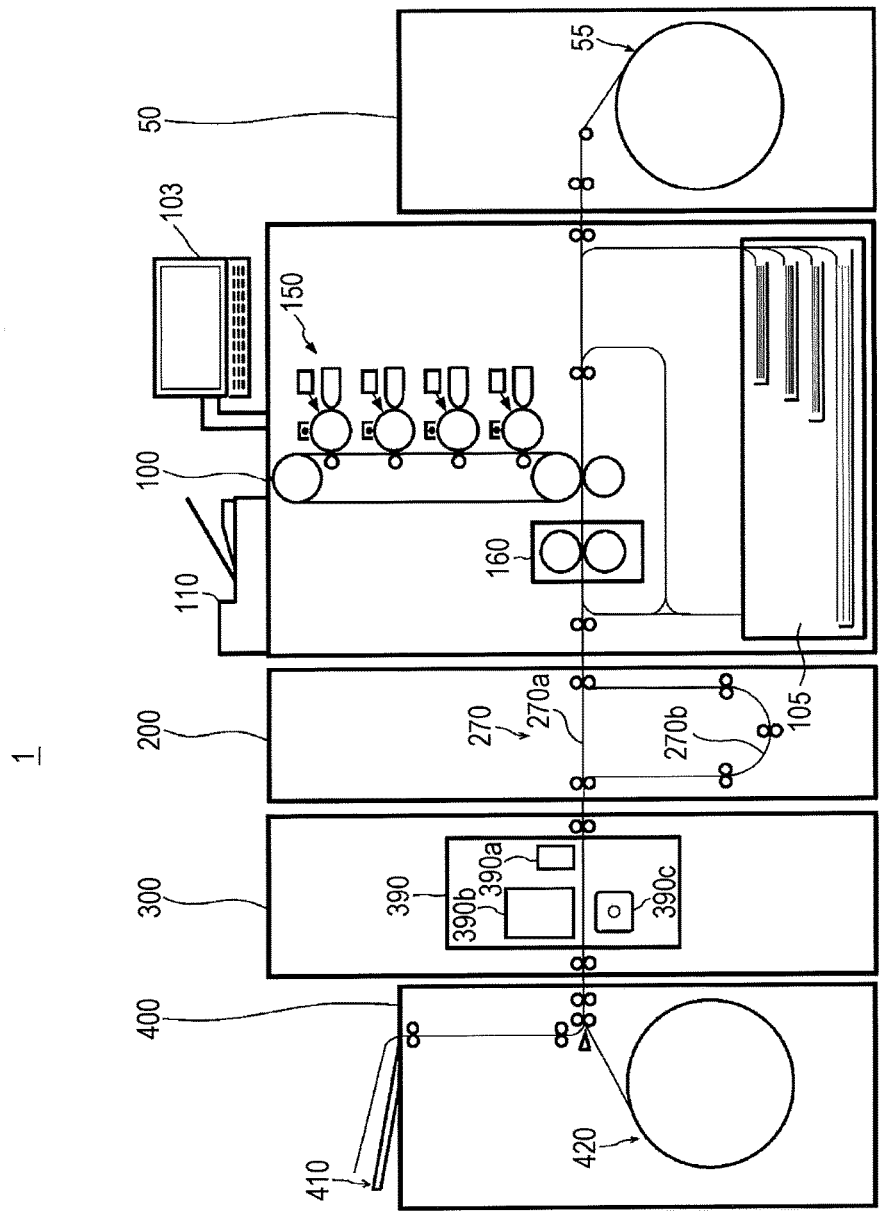
FIG. 16 is a schematic view of the structure of an image forming system according to the embodiment of the present invention.

Specifically, it is possible to use roll paper in the same manner as the above mentioned long paper sheet. FIGS. 15 and 16 show the configuration of an image forming system that is the same as that shown in FIGS. 2 and 4, except for using roll paper. As shown in FIGS. 15 and 16, in the sheet feeding device 50, the sheet feeder 55 feeds roll paper from a transfer paper roll toward the image forming apparatus 100. Further, the sheet discharger 420 discharges the roll paper, which has been supplied as roll paper and has an image formed thereon, as a transfer paper roll while winding the roll paper into a roll. In this case, even in a situation where a long paper sheet is conveyed while being nipped by both the image former 150 and the colorimeter 190 or 390, the transfer paper sheet is conveyed at a second conveyance velocity for both image formation and reading, as in the above described embodiments. Thus, appropriate colorimetry can be performed on an adjustment image formed on roll paper.

In the above embodiments, the threshold value for determining whether a paper sheet is a long paper sheet is preferably determined by the shortest distance between the conveyance roller for conveying the paper sheet at the image formation conveyance velocity and the conveyance roller for conveying paper sheets at the reading conveyance velocity.

According to an embodiment of the present invention, an image forming apparatus, an image forming system, and an image formation control program that reflect one aspect of the present invention achieve the effects described below.

(1) In an image forming apparatus, an image forming system, and an image formation control program that reflect one aspect of the present invention, when a first conveyance velocity is a velocity at which a transfer paper sheet is conveyed when an image is formed by an image former, and is higher than the velocity set for conveying the transfer paper sheet when the image is read by a colorimeter, a second conveyance velocity is a velocity that is lower than the first conveyance velocity and is set as the velocity at which the transfer paper sheet is conveyed when the image is read by the colorimeter, and a long paper sheet having a longer transfer sheet length in the conveying direction than a predetermined threshold value is used as the transfer paper sheet in an adjustment mode in which an adjustment image formed on the transfer paper sheet is read by the colorimeter, the controller controls the image former and the conveyor, to form the adjustment image on the transfer paper sheet being conveyed at the second conveyance velocity, and controls the colorimeter and the conveyor, to read the adjustment image formed on the transfer paper sheet while the transfer paper sheet is being conveyed at the second conveyance velocity. With this structure, even in a situation where a long paper sheet is conveyed while being nipped by both the image former and the colorimeter, the transfer paper sheet is conveyed at the same second conveyance velocity for both image formation and reading. Thus, appropriate colorimetry can be performed on the adjustment image formed on a long paper sheet.

(2) In the above (1), in a case where obtained information about the length of the transfer paper sheet in the conveying direction shows that the adjustment image can be elongated in the conveying direction of the transfer paper sheet, the image former and the conveyor are controlled to form the adjustment image elongated in the conveying direction on the transfer paper sheet being conveyed at the first conveyance velocity, and the colorimeter and the conveyor are controlled to read the adjustment image elongated and formed on the transfer paper sheet while the transfer paper sheet is being conveyed at the first conveyance velocity. With this structure, in a situation where a long paper sheet is conveyed while being nipped by both the image former and the colorimeter, the transfer paper sheet is conveyed at the same first conveyance velocity for both image formation and reading, an adjustment image elongated in the conveying direction is formed on the transfer paper sheet, and the adjustment image elongated in the conveying direction is read with the colorimeter. Thus, appropriate colorimetry can be performed on the adjustment image formed on a long paper sheet.

(3) In the above (2), the adjustment image is formed and elongated in the conveying direction of the transfer paper sheet being conveyed at the first conveyance velocity, to enable the colorimeter to perform reading the same number of time when the adjustment image elongated and formed on the transfer paper sheet is read while the transfer paper sheet is being conveyed at the first conveyance velocity, and when the adjustment image formed on the transfer paper sheet without elongation is read while the transfer paper sheet is being conveyed at the second conveyance velocity. As a result, the reading by the colorimeter in a situation where the transfer paper sheet is conveyed at the first conveyance velocity and the reading by the colorimeter in a situation where the transfer paper sheet is conveyed at the second conveyance velocity are performed the same number of times. As a result, appropriate colorimetry can be performed on the adjustment image formed on a long paper sheet, without any decrease in productivity.

(4) In the above (1), in a case where obtained information about the length of the transfer paper sheet in the conveying direction shows that it is not possible to elongate the adjustment image in the conveying direction of the transfer paper sheet, the image former and the conveyor are controlled to form the adjustment image on the transfer paper sheet being conveyed at the first conveyance velocity, the adjustment image being the same as the adjustment image in a case where the transfer paper sheet is conveyed at the second conveyance velocity, and the colorimeter is controlled to read the adjustment image on the transfer paper sheet being conveyed at the first conveyance velocity a smaller number of times than the number of times the adjustment image on the transfer paper sheet being conveyed at the second conveyance velocity is read. With this structure, appropriate colorimetry can be performed on an adjustment image formed on a long paper sheet, without any decrease in productivity.

(5) In the above (2) through (4), in a case where the lowest conveyance velocity during the image formation by the image former is higher than the second conveyance velocity, the image former forms the adjustment image while conveying the transfer paper sheet at a higher conveyance velocity than the second conveyance velocity, and the colorimeter reads the adjustment image while conveying the transfer paper sheet at a higher conveyance velocity than the second conveyance velocity through elongation of the adjustment image or a small number of reading times. Thus, even in a case where the lowest conveyance velocity during image formation is higher than the second conveyance velocity, appropriate colorimetry can be performed on the adjustment image formed on a long paper sheet.

(6) In the above (1) through (4), the threshold value is determined in accordance with the distance between the position at which the transfer paper sheet being conveyed is nipped by the image former and the position at which the transfer paper sheet being conveyed is nipped by the colorimeter. In a case where the length of the transfer paper sheet in the conveying direction is equal to or greater than the threshold value, the transfer paper sheet is determined to be a long paper sheet, and the above described control is performed. Thus, even in a case where the transfer paper sheet being conveyed extends from the image former to the colorimeter, appropriate colorimetry can be performed on the adjustment image.

(7) In the above (1) through (6), the image former forms on the transfer paper sheet the adjustment image including colorimetric patches in different colors and trigger patches formed to have a predetermined positional relationship with the colorimetric patches, and the colorimeter, which includes a colorimetric sensor that reads the colorimetric patches and a trigger sensor that reads the trigger patches, reads one of the colorimetric patches with the colorimetric sensor after a predetermined time has elapsed since reading of one of the trigger patches by the trigger sensor. As each colorimetric patch is read in accordance with a trigger patch as described above, the colorimetric patches can be correctly read.

(8) In the above (1) through (6), the colorimeter can correctly read each colorimetric patch by reading the adjustment image after a predetermined time has elapsed since detection of the top edge of the transfer paper sheet being conveyed.

(9) In the above (1) through (8), the colorimeter is formed with a spectrophotometer to read the adjustment image formed on the transfer paper sheet, and performs reading a predetermined number of times determined for each of the colorimetric patches included in the adjustment image to correctly read the adjustment image.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
    an image former that forms an image on a transfer paper sheet;
    a colorimeter that reads the image formed on the transfer paper sheet;
    a conveyor that conveys the transfer paper sheet in the image formation at the image former and the reading of the image at the colorimeter; and
    a controller that controls the formation of the image on the transfer paper sheet, and the reading and the conveyance of the image,
    wherein
    when a first conveyance velocity is a velocity at which the transfer paper sheet is conveyed when the image is formed by the image former, and is higher than a velocity set for conveying the transfer paper sheet when the image is read by the colorimeter,
    a second conveyance velocity is a velocity that is lower than the first conveyance velocity and is set as a velocity at which the transfer paper sheet is conveyed when the image is read by the colorimeter, and
    a long paper sheet having a longer transfer sheet length in a conveying direction than a predetermined threshold value is used as the transfer paper sheet in an adjustment mode in which an adjustment image formed on the transfer paper sheet is read by the colorimeter, the controller
    controls the image former and the conveyor, to form the adjustment image on the transfer paper sheet being conveyed at the second conveyance velocity, and
    controls the colorimeter and the conveyor, to read the adjustment image formed on the transfer paper sheet while the transfer paper sheet is being conveyed at the second conveyance velocity.

2. The image forming apparatus according to claim 1, wherein,
    when obtained information about a length of the transfer paper sheet in the conveying direction shows that the adjustment image can be elongated in the conveying direction of the transfer paper sheet,
    the controller
    controls the image former and the conveyor, to form the adjustment image elongated in the conveying direction on the transfer paper sheet being conveyed at the first conveyance velocity, and
    controls the colorimeter and the conveyor, to read the adjustment image elongated and formed on the transfer paper sheet while the transfer paper sheet is being conveyed at the first conveyance velocity.

3. The image forming apparatus according to claim 2, wherein the controller controls the image former, to form the adjustment image elongated in the conveying direction of the transfer paper sheet being conveyed at the first conveyance velocity, and to enable the colorimeter to perform reading the same number of time when the adjustment image elongated and formed on the transfer paper sheet is read while the transfer paper sheet is being conveyed at the first conveyance velocity, and when the adjustment image formed on the transfer paper sheet without elongation is read while the transfer paper sheet is being conveyed at the second conveyance velocity.

4. The image forming apparatus according to claim 2, wherein,
    when the lowest conveyance velocity during image formation by the image former is higher than the second conveyance velocity,
    the controller
    controls the image former to form the adjustment image while conveying the transfer paper sheet at a higher conveyance velocity than the second conveyance velocity, and
    controls the colorimeter to read the adjustment image while conveying the transfer paper sheet at a higher conveyance velocity than the second conveyance velocity through elongation of the adjustment image or a small number of reading times.

5. The image forming apparatus according to claim 1, wherein,
    when obtained information about a length of the transfer paper sheet in the conveying direction shows that it is not possible to elongate the adjustment image in the conveying direction of the transfer paper sheet, the controller
    controls the image former and the conveyor, to form the adjustment image on the transfer paper sheet being conveyed at the first conveyance velocity, the adjustment image being the same as the adjustment image in a case where the transfer paper sheet is conveyed at the second conveyance velocity, and
    controls the colorimeter, to read the adjustment image on the transfer paper sheet being conveyed at the first conveyance velocity a smaller number of times than a number of times the adjustment image on the transfer paper sheet being conveyed at the second conveyance velocity is read.

6. The image forming apparatus according to claim 1, wherein the controller
    determines the threshold value in accordance with a distance between a position at which the transfer paper sheet being conveyed is nipped by the image former and a position at which the transfer paper sheet is nipped by the colorimeter, and,
    when the length of the transfer paper sheet in the conveying direction of the transfer paper sheet is equal to or greater than the threshold value, the transfer paper sheet is determined to be a long paper sheet.

7. The image forming apparatus according to claim 1, wherein
the image former forms on the transfer paper sheet the adjustment image including colorimetric patches in different colors and trigger patches formed to have a predetermined positional relationship with the colorimetric patches,
the colorimeter includes a colorimetric sensor that reads the colorimetric patches, and a trigger sensor that reads the trigger patches, and
the colorimetric sensor reads one of the colorimetric patches after a predetermined time has elapsed since reading of one of the trigger patches by the trigger sensor.

8. The image forming apparatus according to claim 1, wherein the colorimeter reads the adjustment image after a predetermined time has elapsed since detection of the top edge of the transfer paper sheet being conveyed.

9. The image forming apparatus according to claim 1, wherein the colorimeter is formed with a spectrophotometer to read the adjustment image formed on the transfer paper sheet, and performs reading a predetermined number of times determined for each of the colorimetric patches included in the adjustment image.

10. An image forming system comprising:
an image former that forms an image on a transfer paper sheet;
a colorimeter that reads the image formed on the transfer paper sheet;
a conveyor that conveys the transfer paper sheet during the image formation at the image former and the reading of the image at the colorimeter; and
a controller that controls the formation of the image on the transfer paper sheet, and the reading and the conveyance of the image,
the image forming system being provided in different devices to which the image former and the colorimeter are connected,
wherein
when a first conveyance velocity is a velocity at which the transfer paper sheet is conveyed when the image is formed by the image former, and is higher than a velocity set for conveying the transfer paper sheet when the image is read by the colorimeter,
a second conveyance velocity is a velocity that is lower than the first conveyance velocity and is set as a velocity at which the transfer paper sheet is conveyed when the image is read by the colorimeter, and
a long paper sheet having a longer transfer sheet length in a conveying direction than a predetermined threshold value is used as the transfer paper sheet in an adjustment mode in which an adjustment image formed on the transfer paper sheet is read by the colorimeter, the controller
controls the image former and the conveyor, to form the adjustment image on the transfer paper sheet being conveyed at the second conveyance velocity, and
controls the colorimeter and the conveyor, to read the adjustment image formed on the transfer paper sheet while the transfer paper sheet is being conveyed at the second conveyance velocity.

11. The image forming system according to claim 10, wherein,
when obtained information about a length of the transfer paper sheet in the conveying direction shows that the adjustment image can be elongated in the conveying direction of the transfer paper sheet,
the controller
controls the image former and the conveyor, to form the adjustment image elongated in the conveying direction on the transfer paper sheet being conveyed at the first conveyance velocity, and
controls the colorimeter and the conveyor, to read the adjustment image elongated and formed on the transfer paper sheet while the transfer paper sheet is being conveyed at the first conveyance velocity.

12. The image forming system according to claim 11, wherein the controller controls the image former, to form the adjustment image elongated in the conveying direction of the transfer paper sheet being conveyed at the first conveyance velocity, and to enable the colorimeter to perform reading the same number of time when the adjustment image elongated and formed on the transfer paper sheet is read while the transfer paper sheet is being conveyed at the first conveyance velocity, and when the adjustment image formed on the transfer paper sheet without elongation is read while the transfer paper sheet is being conveyed at the second conveyance velocity.

13. The image forming system according to claim 11, wherein,
when the lowest conveyance velocity during image formation by the image former is higher than the second conveyance velocity,
the controller
controls the image former to form the adjustment image while conveying the transfer paper sheet at a higher conveyance velocity than the second conveyance velocity, and
controls the colorimeter to read the adjustment image while conveying the transfer paper sheet at a higher conveyance velocity than the second conveyance velocity through elongation of the adjustment image or a small number of reading times.

14. The image forming system according to claim 10, wherein,
when obtained information about a length of the transfer paper sheet in the conveying direction shows that it is not possible to elongate the adjustment image in the conveying direction of the transfer paper sheet,
the controller
controls the image former and the conveyor, to form the adjustment image on the transfer paper sheet being conveyed at the first conveyance velocity, the adjustment image being the same as the adjustment image in a case where the transfer paper sheet is conveyed at the second conveyance velocity, and
controls the colorimeter, to read the adjustment image on the transfer paper sheet being conveyed at the first conveyance velocity a smaller number of times than a number of times the adjustment image on the transfer paper sheet being conveyed at the second conveyance velocity is read.

15. The image forming system according to claim 10, wherein the controller
determines the threshold value in accordance with a distance between a position at which the transfer paper sheet being conveyed is nipped by the image former and a position at which the transfer paper sheet is nipped by the colorimeter, and,
when the length of the transfer paper sheet in the conveying direction of the transfer paper sheet is equal to or greater than the threshold value, the transfer paper sheet is determined to be a long paper sheet.

16. The image forming system according to claim 10, wherein
- the image former forms on the transfer paper sheet the adjustment image including colorimetric patches in different colors and trigger patches formed to have a predetermined positional relationship with the colorimetric patches,
- the colorimeter includes a colorimetric sensor that reads the colorimetric patches, and a trigger sensor that reads the trigger patch, and
- the colorimetric sensor reads one the colorimetric patches after a predetermined time has elapsed since reading one of the trigger patches by the trigger sensor.

17. The image forming system according to claim 10, wherein the colorimeter reads the adjustment image after a predetermined time has elapsed since detection of the top edge of the transfer paper sheet being conveyed.

18. The image forming system according to claim 10, wherein the colorimeter is formed with a spectrophotometer to read the adjustment image formed on the transfer paper sheet, and performs reading a predetermined number of times determined for each of the colorimetric patches included in the adjustment image.

19. A non-transitory recording medium storing a computer readable image formation control program for controlling an apparatus that includes:
- an image former that forms an image on a transfer paper sheet;
- a colorimeter that reads the image formed on the transfer paper sheet;
- a conveyor that conveys the transfer paper sheet in the image formation at the image former and the reading of the image at the colorimeter; and
- a controller that controls the formation of the image on the transfer paper sheet, and the reading and the conveyance of the image, wherein when a first conveyance velocity is a velocity at which the transfer paper sheet is conveyed when the image is formed by the image former, and is higher than a velocity set for conveying the transfer paper sheet when the image is read by the colorimeter, a second conveyance velocity is a velocity that is lower than the first conveyance velocity and is set as a velocity at which the transfer paper sheet is conveyed when the image is read by the colorimeter, and a long paper sheet having a longer transfer sheet length in a conveying direction than a predetermined threshold value is used as the transfer paper sheet in an adjustment mode in which an adjustment image formed on the transfer paper sheet is read by the colorimeter, the computer readable image formation control program causes a computer of the image forming apparatus to perform:

controlling the image former and the conveyor, to form the adjustment image on the transfer paper sheet being conveyed at the second conveyance velocity; and controlling the colorimeter and the conveyor, to read the adjustment image formed on the transfer paper sheet while the transfer paper sheet is being conveyed at the second conveyance velocity.

* * * * *